G. F. RENDALL.
PROCESS FOR REDUCTION OF ORES.
APPLICATION FILED JUNE 23, 1908. RENEWED JULY 2, 1912.
1,053,436.
Patented Feb. 18, 1913.
2 SHEETS—SHEET 1.
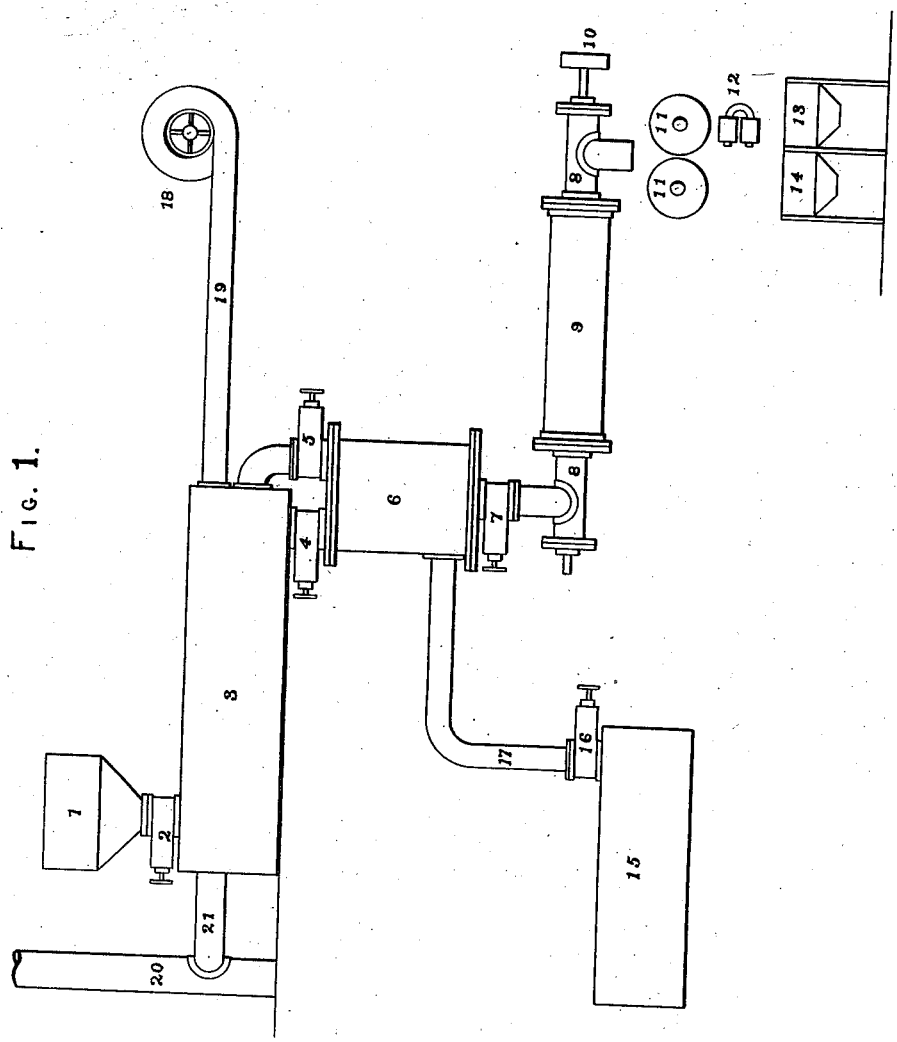

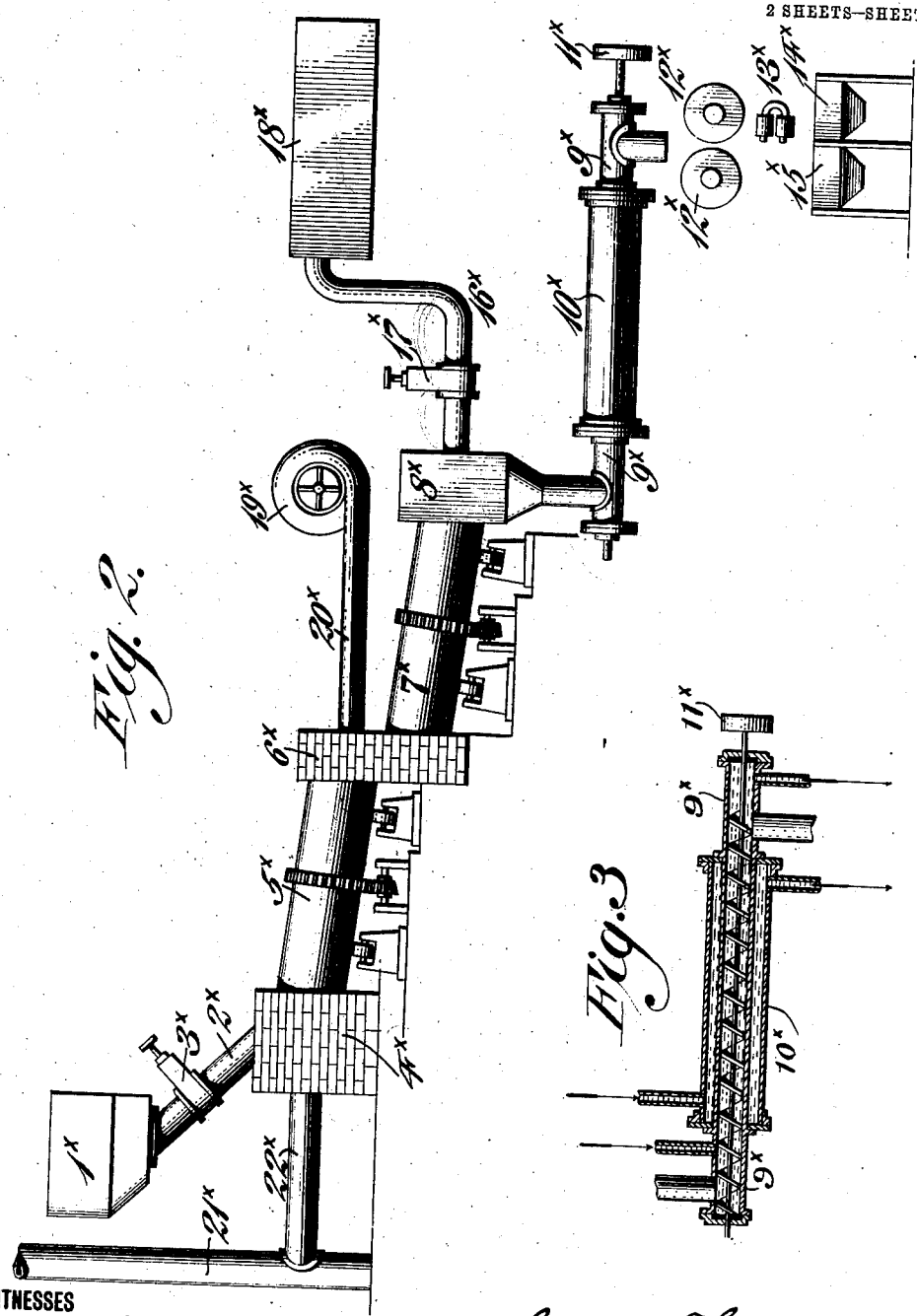

UNITED STATES PATENT OFFICE.

GEORGE FREDERICK RENDALL, OF NEW YORK, N. Y., ASSIGNOR TO R. W. PRIEST, TRUSTEE, OF NEW YORK, N. Y.

PROCESS FOR REDUCTION OF ORES.

1,053,436. Specification of Letters Patent. Patented Feb. 18, 1913.

Application filed June 23, 1908, Serial No. 440,047. Renewed July 2, 1912. Serial No. 707,350.

*To all whom it may concern:*

Be it known that I, GEORGE FREDERICK RENDALL, a citizen of the United States, residing in the city of New York, county of New York, and State of New York, have invented a new and useful Process for Reduction of Ores, of which the following is a specification.

My invention relates to the method of treating metal ores and is particularly well adapted to remove all the impurities from metals before reducing them to a molten condition so that the silica and associated material are separated without the utilization of fluxes whereby great economy is effected.

It consists of subjecting the ore, which has previously been heated, to the action of hydro-carbon gases and varying these gases to meet the different conditions existing in the ore and then discharging the reduced ore into a cooling chamber, whereby reoxidation is prevented.

It further consists of combining the metallic oxids, which are separated from the ore, with a suitable binding material to form briquets, which latter may then be readily melted in a cupola furnace.

It further consists of other novel features of construction, all as will be hereinafter fully set forth.

Figure 1 represents a plant wherein the process embodying my invention is carried out. Fig. 2 represents a modification of the plant disclosed in Fig. 1 wherein my process is carried out on a different grade of ore. Fig. 3 represents a section through the cooling cylinder.

Similar numerals of reference indicate corresponding parts in the figures.

Referring to the drawings:—1 designates a hopper adapted to receive ore which has been crushed to a suitable size after it is received directly from the mines. The outlet from this hopper 1 is controlled by a suitable valve 2 whereby the crushed ore is delivered at suitable intervals and in definite quantities to a furnace 3 which performs the function of pre-heating the ore and bringing it to a temperature approximating a red heat before it is passed through a reducing step. It will of course be understood that the pre-heating chamber 3 may be either of a stationary or rotary type and is provided with suitable burners for igniting the gas and a sufficient quantity of air is supplied thereto from an apparatus to be presently described. This pre-heating step is quite an important one since it renders the ore porous and amenable to the action of the hydro-carbon gases during the reducing step and in the case of ores containing oxids of iron, porosity is most essential. The pre-heated ore is delivered to a reducing furnace 6 through a valve 4, while a second valve 5 controls the flow of gas from the reducing furnace 6 to the pre-heating furnace and enables the gas to be used under pressure. Within this reducing furnace 6 the ore is heated by the hydro-carbon gases which are generated in a nearby apparatus to be presently described, the preferred temperature being about 1000° for best results and should never exceed 1250° F. since if this temperature is exceeded the silica frits and agglomerates thus preventing the action of the gases from reducing the oxids to native condition. The ore after its deoxidation in the reducing furnace 6, is delivered through control valve 7 to a conveyer 8, incased in a water jacket 9, whereby the temperature is lowered and prevents reoxidation.

The conveyer is preferably of the screw type and operated through the medium of a shaft carrying a pulley 10, driven by any desired type of motor. Located adjacent the outlet of the conveyer are a number of rollers 11 suitably mounted and positioned in the path of the ore as it descends in its discharge from the conveyer mechanism. These rollers are of course driven in any well known manner and operate to crush the deoxidized ore to a degree of fineness which is best suited for the extraction of the particles of native metal from the silicious material to which they adhere in the treated ore. As the ore passes through the rollers 11 it falls in close proximity to a magnetic separator 12 which operates to pull the iron particles to one side and separate them from the other material, the bin 13 serving to receive the extracted iron while the dross falls directly into a bin 14. The bin 13 now contains all of the valuable material which is next dry screened and the flake or flattened particles of material are separated and melted. The residual portion from the dry screening which consists of dust and parts of the metal, is combined with a suitable material such as coke, coal, peat, or other substance into a briquet. These briquets must necessarily be of great purity since they are composed mainly of metal and metallic oxids and are readily melted in a cupola furnace into very pure metal.

15 designates a retort heated by any suitable means in which a hydro-carbon gas is generated and passes through the valve 16 and by the conduit 17 to the reducing furnace 6 whereby the oxids are reduced to a metallic state.

18 designates a fan driven in any well known manner and blowing air from a conduit 19 to the pre-heater 3 from which it is discharged to an exhaust 20 of a conduit 21. It will be apparent that this auxiliary air supply is necessary in order to combine with the gas delivered from the reducing furnace 6 to produce an inflammable mixture.

In the modification of Fig. 2, an apparatus is shown embodying my process which is especially adapted for use where fine ores, as sands, which have been eroded, crushed and concentrated by nature and more particularly that type of ore known as iron sands are to be treated. In this form the reducing furnace $7^x$ should be mounted in any suitable manner for rotation in order that the sand may be prevented from packing, in which condition it is not amenable to the gas treatment. It has been found in practice that in a stationary reducing furnace through which sand ore is passed great difficulty is experienced by the sand becoming packed and thereby the greater part of the ore does not come in contact with the hydro-carbon gas and consequently its reduction is imperfectly carried out. In order, therefore, to convey the iron sand ore to the reducing furnace $7^x$ a rotatable pre-heating furnace $5^x$ is provided which automatically delivers the ore into a chamber $6^x$ from which it passes to the revolving reducing furnace $7^x$.

$8^x$ designates a hopper delivering the ore to a conveyer cylinder $9^x$ in which a conveyer similar to that of Fig. 1 is operated by means of a shaft carrying pulley $11^x$ and a water cooling cylinder $10^x$ surrounds the same as described for the previous figure. Adjacent the outlet of the conveyer are rollers $12^x$ suitably positioned to receive the ore and crush it to a suitable degree of fineness to be operated upon by a magnetic separator $13^x$, which serves to deliver the extracted metal to the bin $14^x$ while the other material descends into a bin $15^x$.

$18^x$ designates a retort in which the gas is generated in a manner similar to that before described, the gas being delivered by means of a conduit $16^x$ to the hopper $8^x$ and controlled in its passage by means of the valve $17^x$.

$19^x$ designates a fan blower supplying air to the rotary pre-heating chamber through the conduit $20^x$, the same exhausting through the pipe $31^x$ and the conduit $22^x$. It will be understood that no air must be allowed to enter the chambers $6^x$, $7^x$, $8^x$, as no combustion should take place until the gas has left these chambers and passed to the pre-heating chamber $5^x$. Provision is of course necessary to prevent danger from explosion and pilot burners are suitably positioned to light the gases at the proper points.

There are of course many methods and ways of effecting the results that I obtain and my process may with some ores be successfully operated without the use of a cooling device.

It will be noted that as the metallic particles, oxids and dross leave the rollers that they are in a state ready for separation, which usually takes place in some type of concentrator as where iron ores are under treatment, magnetic separation may be successfully operated while other metals, such as copper, silver or the like, dry concentration operating with a suction draft may be used.

Particular attention is directed to the novel method of combining the metallic particles into briquets ready for melting. Any residual oxid not reduced to metallic form is combined with the residual carbon, remaining after the volatile hydro-carbon gases have been expelled and used for the purpose of deoxidizing the ore, as hereinbefore shown. I attach great importance to this method of reduction and the economy it effects.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent is:—

1. The method of treating ore which consists of heating said ore by gas under combustion, passing through the heated ore a current of hydrogenous gas and discharging the ore into a water jacketed cooling device to prevent immediate reoxidation and crushing the cooled material to a suitable fineness.

2. The method of treating ore which consists of preheating a quantity of ore, passing a volume of air through said ore during the preheating, delivering the ore to a reducing furnace, and subjecting it to a current of hydrogenous gas and subjecting the reduced ore to a cooling action to prevent reoxidation.

3. The method of treating ore which consists of preheating a quantity of ore, passing a volume of air through said ore during the preheating, delivering the ore to a reducing furnace, and subjecting it to a current of hydrogenous gas and subjecting the reduced ore to a cooling action to prevent reoxidation and separating the metallic parts from the dross and oxids.

GEORGE FREDERICK RENDALL.

Witnesses:
E. HAYWARD FAIRBANKS,
C. D. McVAY.